United States Patent
Kamat (10) Patent No.: US 10,867,374 B2
(45) Date of Patent: Dec. 15, 2020

(54) AUTO-FOCUSING SYSTEM AND METHOD BY DETERMINING CONTRAST DIFFERENCE BETWEEN ADJACENT PIXELS USING SOBEL FILTER

(71) Applicant: Sensors Unlimited, Inc., Princeton, NJ (US)

(72) Inventor: Komal H. Kamat, Plainsboro, NJ (US)

(73) Assignee: Sensors Unlimited, Inc., Princeton, NJ (US)

( * ) Notice: Subject to any disclaimer, the term of this patent is extended or adjusted under 35 U.S.C. 154(b) by 35 days.

(21) Appl. No.: 15/431,410

(22) Filed: Feb. 13, 2017

(65) Prior Publication Data

US 2018/0234616 A1 Aug. 16, 2018

(51) Int. Cl.
*H04N 5/232* (2006.01)
*G06T 5/20* (2006.01)
*H04N 5/217* (2011.01)
*H04N 5/357* (2011.01)

(52) U.S. Cl.
CPC .............. *G06T 5/20* (2013.01); *H04N 5/217* (2013.01); *H04N 5/232123* (2018.08); *H04N 5/357* (2013.01)

(58) Field of Classification Search
CPC ..... H04N 5/217; H04N 5/232123; G06T 5/20
USPC ........................................................ 348/353
See application file for complete search history.

(56) References Cited

U.S. PATENT DOCUMENTS

| | | | |
|---|---|---|---|
| 8,086,062 B2 | 12/2011 | Lin et al. | |
| 8,135,231 B2 | 3/2012 | Chao et al. | |
| 8,218,082 B2 | 7/2012 | Chiu et al. | |
| 8,249,355 B2 | 8/2012 | Bohm et al. | |
| 8,259,217 B2 | 9/2012 | Chou et al. | |
| 8,284,296 B2 | 10/2012 | Chou et al. | |
| 9,354,489 B2 | 5/2016 | Fluckiger | |
| 2002/0054299 A1* | 5/2002 | Freifeld | G01B 11/024 356/625 |
| 2005/0286790 A1* | 12/2005 | Gilgen | H04N 19/105 382/245 |
| 2006/0007497 A1* | 1/2006 | Yokochi | H04N 1/40062 358/3.27 |
| 2007/0195089 A1* | 8/2007 | Furukado | G06T 17/05 345/426 |
| 2009/0074393 A1* | 3/2009 | Park | H04N 5/23212 396/104 |
| 2009/0148022 A1* | 6/2009 | Lee | G06T 7/60 382/132 |
| 2010/0135583 A1* | 6/2010 | Park | H04N 17/04 382/199 |
| 2012/0268624 A1* | 10/2012 | Denisenkov | H04N 5/23245 348/231.2 |
| 2013/0315470 A1* | 11/2013 | Watson | G06T 7/75 382/154 |

(Continued)

*Primary Examiner* — Usman A Khan
(74) *Attorney, Agent, or Firm* — Locke Lord LLP; Joshua L. Jones; Scott D. Wofsy (57) ABSTRACT

A method of focusing an imaging device includes acquiring an image. A determination is made whether contrast difference between a pixel and one or more adjacent pixels is likely due to noise, or whether the contrast difference is due to the image being out-of-focus. Focus of the imaging device is when the contrast difference is due to the image being out-of-focus while contrast difference determined to likely be due to noise is ignored.

12 Claims, 5 Drawing Sheets

(56) References Cited

U.S. PATENT DOCUMENTS

| | | | |
|---|---|---|---|
| 2014/0049682 A1* | 2/2014 | Galstian | G02B 7/38 |
| | | | 348/356 |
| 2015/0288936 A1* | 10/2015 | Jakubiak | H04N 9/317 |
| | | | 353/101 |
| 2017/0070677 A1* | 3/2017 | Nilsson | H04N 5/23212 |

* cited by examiner

AUTO-FOCUSING SYSTEM AND METHOD BY DETERMINING CONTRAST DIFFERENCE BETWEEN ADJACENT PIXELS USING SOBEL FILTER

BACKGROUND OF THE INVENTION

1. Field of the Invention

The present disclosure relates to imaging, and more particularly to focusing imaging devices using contrast difference techniques.

2. Description of Related Art

Imaging devices employ electronic sensors or light sensitive films to capture images. The images are generally acquired using a pre-determined focus, which is indicative of where light rays originating from an object of interest in a scene converge. Some imaging devices employ auto-focusing techniques to determine focus prior to acquiring an image.

Auto-focusing techniques generally capture an image of a scene, process the image to determine whether the image is in focus, and generate a feedback signal that is used to vary the focus of the imaging device iteratively until a suitable focus is determined for imaging an object of interest in the scene. Examples of auto-focusing techniques include phase difference techniques, which generally divide an image in to an image pair and analyze the image pair for phase differences indicative of focus, and contrast difference techniques. Contrast difference techniques typically entail analyzing intensity difference between adjacent pixels within an image. In noisy images there can be high contrast between adjacent pixels in an unfocused image, which can cause some auto-focusing systems to incorrectly determine the best focus for acquiring an image.

Such conventional methods and systems have generally been considered satisfactory for their intended purpose. However, there is still a need in the art for improved auto-focusing systems and methods determining focus. The present disclosure provides a solution for this need.

SUMMARY OF THE INVENTION

A method of focusing an imaging device includes acquiring an image. A determination is made as to whether contrast difference between a pixel and one or more adjacent pixels is likely due to noise, or whether the contrast difference is due to the image being out-of-focus. Focus of the imaging device is adjusted when the contrast difference is due to the image being out-of-focus while contrast difference determined to likely be due to noise is ignored.

In certain embodiments, focusing the imaging device can include receiving a contrast threshold. Contrast differences likely due to noise can be determined by comparing the contrast difference between the pixel and one or more adjacent pixels with the threshold. The threshold can be applied within a modified Sobel filter, on a pixel-by-pixel basis, prior to the contrast between the pixel and one or more adjacent pixels being added to image contrast summation.

In accordance with certain embodiments, a contrast gradient can be generated for one more pixels in the image. The contrast gradient can be a vertical contrast gradient or a horizontal gradient. The threshold can be a vertical threshold. The vertical threshold can be applied to a vertical contrast gradient array. The threshold can be a horizontal threshold. The horizontal threshold can be applied to a horizontal contrast gradient array. The horizontal threshold can be the same as the vertical threshold. The horizontal threshold can be different than the vertical threshold. Contrast generated by noise in the image can be removed from a contrast summation for evaluating focus of the image. Noise in the image can be checked by comparing contrast different for each pixel with the contrast threshold.

It is also contemplated that, in accordance with certain embodiments, contrast difference between the adjacent pixel can be added to a contrast summation for the image when contrast is within the contrast threshold. Zero can be added to the contrast summation regardless of the actual contrast difference between the adjacent pixels when the contrast difference is above the contrast threshold. The noise checking can be done on a pixel-by-pixel basis within the image. The noise checking can be done within a Sobel filter for an autofocusing algorithm.

An imaging device includes a focus adjustment arrangement, an image acquisition module in operable communication with the focus adjustment arrangement, a contrast difference module, and a processor. The contrast difference module is configured to determine a contrast difference between adjacent pixels in an image acquired by the image acquisition module. The processor is configured to provide adjustment input to the focus adjustment module based the determined contrast difference and to ignore the determined contrast difference if the determined contrast difference is likely due to noise instead of the image being out of focus.

In certain embodiments, the focus adjustment module can includes one or more movable lens. The imaging device can include a non-transitory machine-readable medium having plurality of program modules recorded thereon with instructions that, when read by the processor, cause the processor to perform certain actions. For example, the instructions can cause the processor to determine contrast difference between adjacent pixels in the image. The instructions can cause the processor to determine whether the contrast difference is likely due to noise or to the image being out-of-focus. The instructions can cause the processor to adjust focus while ignoring contrast differences determined to likely be due to noise.

In accordance with certain embodiments, the instructions can cause the processor to check for noise in the image by comparing contrast difference for each pixel with a contrast threshold. Based on the comparison, contrast from the image generated by noise can be removed from a contrast summation focus ranking on a pixel-by-pixel basis. It is also contemplated that a contrast threshold for a Sobel filter can be received by the imaging device, a contrast gradient matrix generated for one or more pixels in the image, and contrast between the pixel and one or more adjacent pixels be compared to a threshold prior to the contrast being added to a contrast summation for the image for assessing focus of the image.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
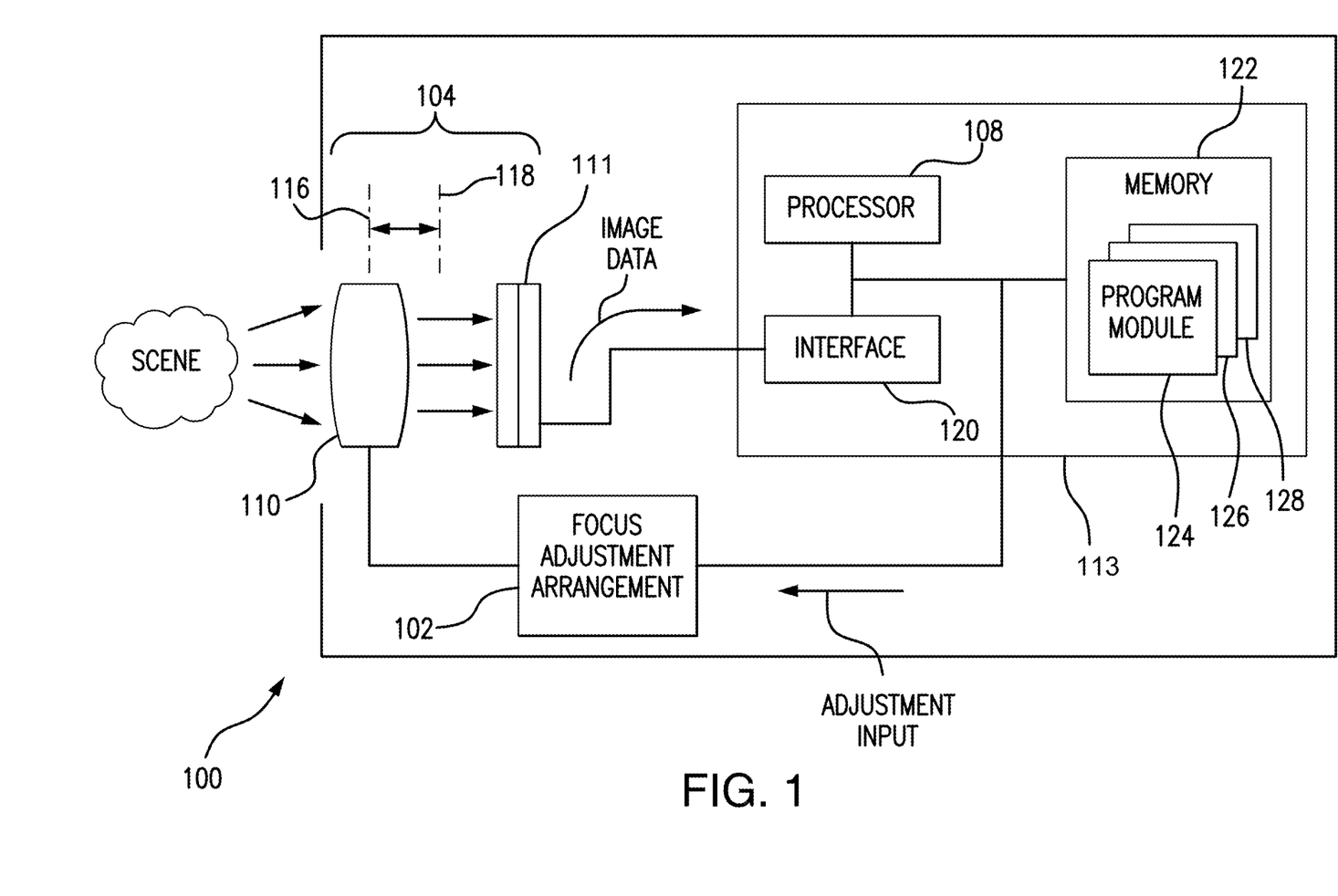
FIG. 1 is a schematic view of an exemplary embodiment of an imaging device constructed in accordance with the present disclosure, showing a focus adjustment arrangement receiving an adjustment input from a contrast difference module.

Reference will now be made to the drawings wherein like reference numerals identify similar structural features or aspects of the subject disclosure. For purposes of explanation and illustration, and not limitation, a partial view of an exemplary embodiment of a imaging device 100 with a contrast difference module in accordance with the disclosure is shown in FIG. 1 and is designated generally by reference character 100. Other embodiments of imaging devices and methods of focusing imaging devices in accordance with the present disclosure, or aspects thereof, are provided in FIGS. 2-5, as will be described. The systems and methods described herein can be used for imaging device autofocusing, such as in short-wave infrared (SWIR) imaging devices, though the present disclosure is SWIR imaging devices or to autofocusing in general.

Referring to FIG. 1, imaging device 100 is shown. Imaging device 100 includes a focus adjustment arrangement 102, an image acquisition module 104, a contrast difference module 128, and a processor 108. Contrast difference module 128 is communicative with focus adjustment arrangement 102 and is configured to determine contrast difference between adjacent pixels in an image acquired by image acquisition module 104. Focus adjustment arrangement 102 is in operable communication with image acquisition module 104 to establish the focus position at which image acquisition module 104 acquires images of a scene. Processor 108 is configured to provide adjustment input to focus adjustment arrangement 102 based on the determined contrast difference between the adjacent pixels and ignore the determined contrast difference if the determined contrast difference is likely due to noise instead of the image being out-of-focus.

In the illustrated exemplary embodiment, imaging device 100 also includes a lens 110, an imaging array 111, and a control module 113. Lens 110 is optically coupled to imaging array 111 and is movable between a first focus position 116, wherein imaging device 100 acquires image data at first focus position 116, and a second focus position 118, wherein imaging device 100 acquires image data at second focus position 118 which is different than first focus position 116. Focus adjustment arrangement 102 is arranged to move lens 110 between first focus position 116 and second focus position 118. Selection of the focus position at which a given image is acquired is according to a focus adjustment input, provided by processor 108, which based on contrast difference sum provided by contrast difference module 128.

Imaging array 111 includes a plurality of indium-gallium-arsenide (InGaAs) solid-state photodetectors. The InGaAs solid-state photodetectors are arranged to convert electromagnetic radiation within a shortwave infrared radiation (SWIR) waveband from light reflected from a scene and collected by lens 110. Using the InGaAs solid-state photodetectors, imaging array 111 generates image data corresponding to electromagnetic radiation incident upon imaging array 111. The image data is provided by imaging array 111 to contrast difference module 128 via control module 113.

Control module 113 includes processor 108, an interface 120, and a memory 122. Processor 108 is disposed in communication with imaging array 111 and memory 122 through interface 120. Memory 122 has a plurality of program modules 124 recorded thereon having instructions that, when read by processor 108, cause control module 113 to execute certain operations. For example, memory 122 includes an auto-focusing module 126 and contrast difference module 128, which cooperate to determine adjustment input for focus adjustment arrangement 102 based on a contrast summation generated by contrast difference module. In certain embodiments, contrast difference module 128 can be a modified Sobel module configured to provide threshold intensity difference between a pixel and one or more adjacent pixels prior to incorporation of the contrast into a contrast summation for the image for assessing focus of the image.

Figure 2:
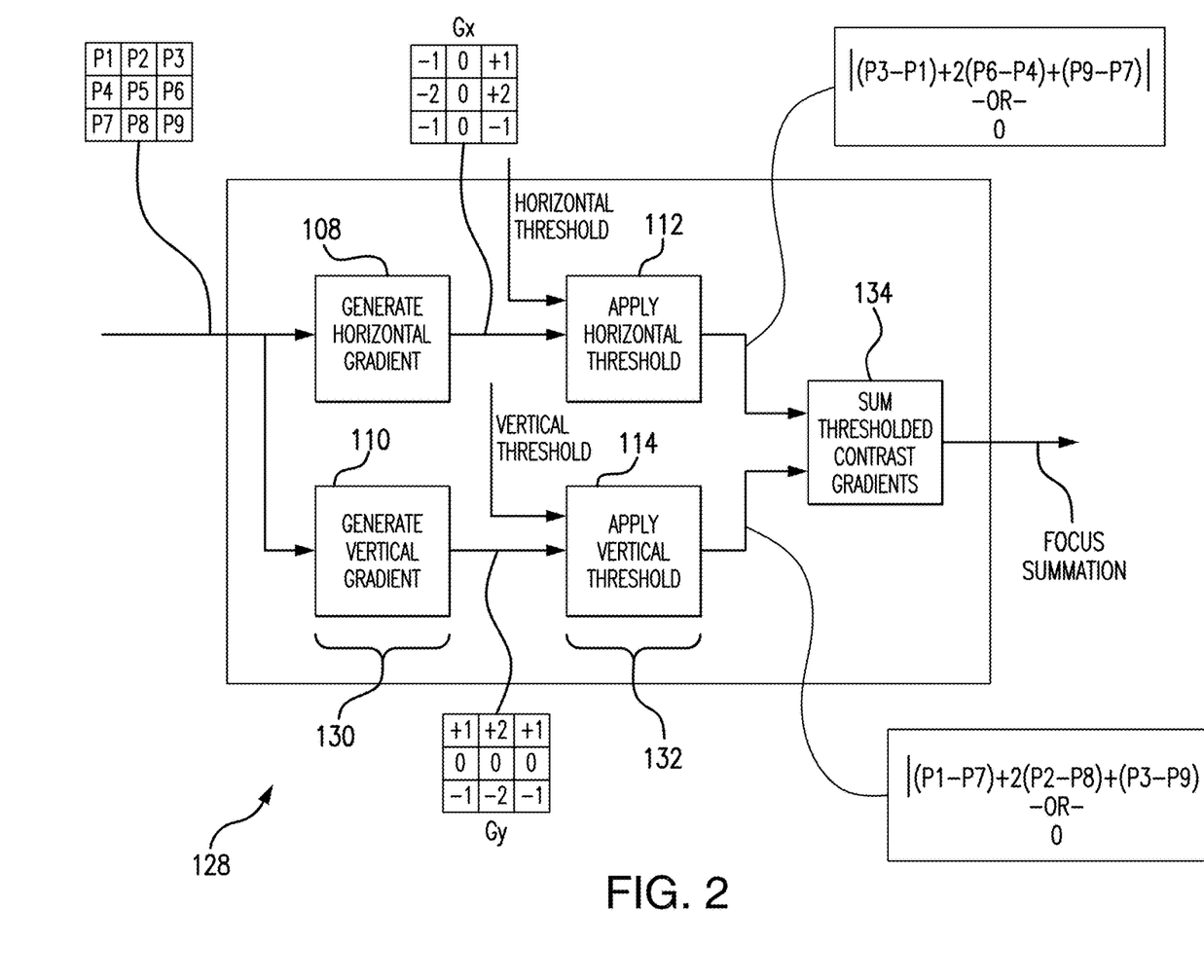
FIG. 2 is a block diagram of the contrast difference module of FIG. 1, showing a thresholding block applying a threshold to ignore pixel contrast likely due to noise in the image.

With reference to FIG. 2, contrast difference module 128 is shown. Contrast difference module 128 includes a gradient module 130, a thresholding module 132, and a contrast summation module 134. Gradient module 130 is disposed in communication with imaging array 111 (shown in FIG. 1) and is arranged to receive therefrom image data acquired by imaging array 111. In the illustrated exemplary embodiment the image data includes a pixel intensity array, e.g., pixels P1-P9, from which gradient module 130 generates a gradient array, e.g., horizontal gradient array Gx and/or vertical gradient array Gy, which gradient module 130 provides to thresholding module 132.

Thresholding module 132 is disposed in communication with memory 122 (shown in FIG. 1) and gradient module 130. From memory 122 thresholding module 132 receives a threshold, e.g., a horizontal threshold, and/or a vertical threshold. It is contemplated that the threshold be a cutoff value, resident (preprogrammed) on memory 122 or received from a user input device, for comparison with the sum of contrast gradients between a given pixel and one or more adjacent pixels. When the sum is greater than the threshold the contrast sum is deemed to be due to noise, and is excluded from a focus summation calculated for the image. When sum of the contrast gradients is between zero and the threshold the sum of the contrast gradients is deemed to not be due to noise, and is provided to contrast summation module 134 for accessing focus of the image from which the image data was generated.

Contrast summation module 134 is disposed in communication with thresholding module 132 and is arranged to receive from thresholding module 132, e.g., horizontal thresholding module 112 and/or vertical thresholding module 114, thresholded sums of contrast gradients between each pixel in the image and adjacent pixels. Contrast summation module 134 adds each received contrast gradient sum to a focus summation for the image, the contrast gradient sum representing contrast in the image associated with focus position exclusive of noise in the image. It is contemplated that contrast summation generated by contrast summation module 134 include contrast sums for each pixel in the image that are between the threshold and zero and exclude sums for pixels where the gradient sum is greater than the threshold.

Horizontal thresholding entails excluding contrast values that are above a horizontal minimum threshold value and below a horizontal maximum threshold. In this respect, horizontal thresholding module 112 compares horizontal gradient array Gx according to Equation 1 to the horizontal threshold received from memory 122.

$$|(P3-P1)+2(P6-P4)+(P9-P7)| \quad \text{Equation 1:}$$

If the result of Equation 1 for a horizontal gradient array Gx for a given pixel is greater than the horizontal threshold received from memory 122, then horizontal thresholding module 112 provides a null value, i.e. zero, to contrast summation module 134 for incorporating into the contrast summation for the image as the contribution to the contrast summation for the given pixel. If the result of Equation 1 for a horizontal gradient array Gx for a given pixel is less than the horizontal threshold received from memory 122, then horizontal thresholding module 112 provides result of Equation 1 to contrast summation module 134 for incorporating into the contrast summation for the image as the contribution to the contrast summation for the given pixel.

Vertical thresholding entails excluding contrast values that are above a vertical minimum threshold value and below a vertical maximum threshold. In this respect, vertical thresholding module 114 compares vertical gradient array Gy according to Equation 1 to the vertical threshold received from memory 122.

$$|(P3-P7)+2(P2-P8)+(P3-P9)| \quad \text{Equation 2:}$$

If the result of Equation 2 for a vertical gradient array Gy for a given pixel is greater than the vertical threshold received from memory 122, then vertical thresholding module 114 provides a null value, i.e. zero, to contrast summation module 134 for incorporating into the contrast summation for the image as the contribution to the contrast summation for the given pixel. If the result of Equation 2 for a vertical gradient array Gy for a given pixel is less than the vertical threshold received from memory 122, then vertical thresholding module 114 provides result of Equation 2 to contrast summation module 134 for incorporating into the contrast summation for the image as the contribution to the contrast summation for the given pixel.

It is contemplated that the threshold can be resident within memory 122. The threshold can be preprogrammed into imaging device 100 (shown in FIG. 1). It is also contemplated that the threshold can be received from a user, such as from a user input device. Configurable threshold allows imaging device 100 to be de-sensitized variation in the imaging environment, such as when an imaging device is moving relative to an object of interest in scene that is being imaged.

It is also contemplated that a common threshold can be used for the horizontal and vertical gradient arrays data. In accordance with certain embodiments, different values can be used for the horizontal threshold and the vertical threshold. For example, the horizontal threshold can be greater that the vertical threshold. Alternatively, the vertical threshold can be greater than the horizontal threshold. Different threshold values for horizontal and vertical thresholds can sensitize the filtering process to certain types of objects which may be present in the scene imaged by imaging device 100.

Figure 3:
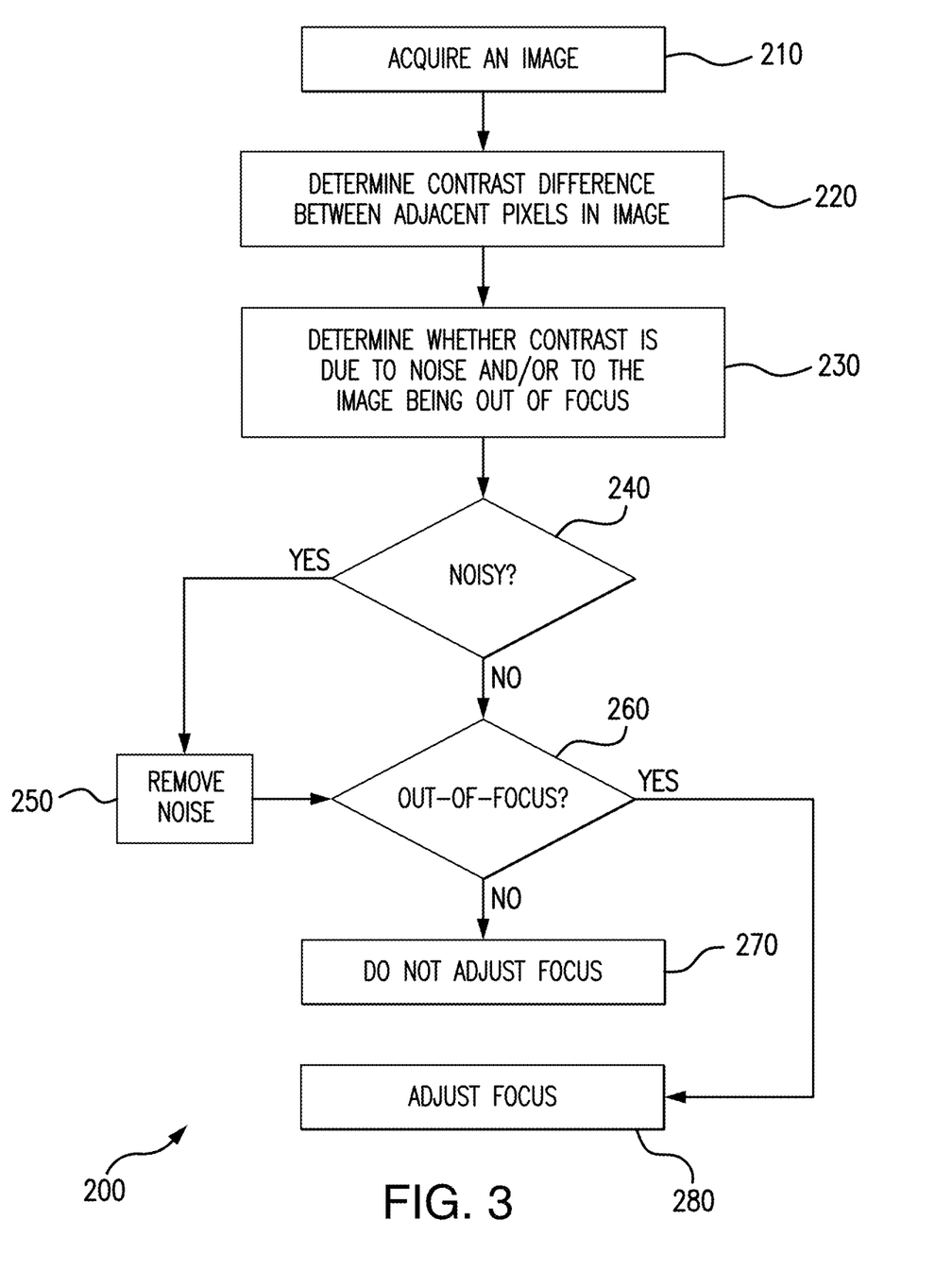
FIG. 3 is a flow chart of a method for adjusting focus of an imaging device, showing steps of the method.

With reference to FIG. 3, a method 200 of focusing an imaging device, e.g., imaging device 100 (shown in FIG. 1), is shown. Method 200 includes acquiring an image, as shown with box 210. The image can be acquired at a first focus position, e.g., first focus position 16 (shown in FIG. 1), a second focus position, e.g., a second focus position 18 (shown in FIG. 1), or at a focus position between the first and second position. Focus can be adjusted by driving a lens, e.g., lens 110 (shown in FIG. 1), using a focus adjustment arrangement, e.g., focus adjustment arrangement 102 (shown in FIG. 1). The focus can be selected based on a focus adjustment determined based upon contrast differences between pixels and surrounding pixels within an image.

Once acquired the image is converted into image data and provided to a contrast difference module, e.g., contrast difference module 128 (shown in FIG. 1). The contrast difference module determines contrast difference between each pixel and one or more of the surrounding pixels, as shown with box 220. It is contemplated that the contrast difference module determine whether contrast between a pixel and one or more adjacent pixels is due to noise or to the image being out of focus, as shown in box 240. This can be done by thresholding the contrast difference for the pixel, such as be comparing the horizontal and/or vertical contrast with a horizontal and/or vertical threshold, on a pixel by pixel basis within a Sobel filter.

When the contrast is determined to be due to noise the noise is removed, as shown with box 250. Noise removal can be done by ignoring the contrast, such as be assigning the contrast contribution for the pixel a value of zero for purposes of a contrast summation value generated for the image subsequently used for generating an adjustment input for the imaging system. When the contrast is deemed to not be due to noise, i.e., is below the threshold, the contrast value for the pixel is added to the contrast summation value generated for the image, as shown by the arrow between boxes 240 and 260.

Once the contrast gradient for each pixel in relation to one or more adjacent pixels in the image is thresholded, and aggregated into a contrast summation for the image as either zero or the actual gradient value for purposes of assessing focus of the image, focus of the image is determined, as shown with box 260. If the focus is determined to be acceptable, no adjustment is made to the focus position of the imaging system, as shown with box 270. If the contrast summation indicates the image is out of focus then focus is adjusted, as shown with box 280. Focus adjustment can include generating an adjustment input based on comparison of contrast summations for images acquired at difference focus positions, e.g., first and second focus positions.

With reference to FIGS. 4A-4D, exemplary images 1-4 of a focus target 5 are shown. Images 1-3 are acquired at different focus positions, image 3 being acquired at a better focus position than images 1 and 2. Image 4 is acquired at the same focus position as image 3 and additionally includes noise, which was added during image by introducing thermal instability into the imaging arrangement when image 4 was acquired. Image 1 in FIG. 4A was acquired at a focus position which is grossly out of focus. Image 2 in FIG. 4B was acquired a focus position which is closer to best focus than image 1, but is also out of focus. Image 3 in FIG. 4C and image 4 in FIG. 4D were each acquired at best focus.

Figure 4A:
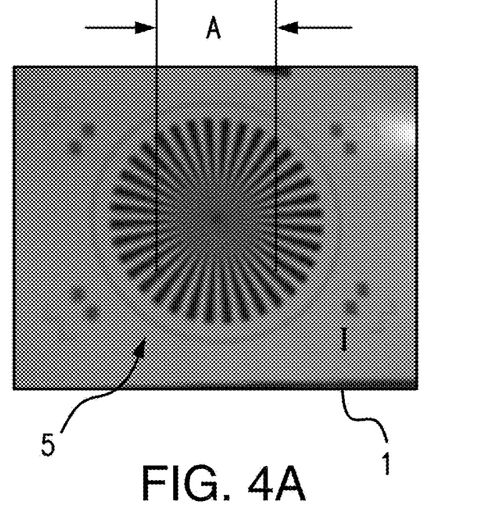
FIGS. 4A-4D are images of a focus target, showing the effects of focus and noise on contrast within the respective images.
Figure 4B:
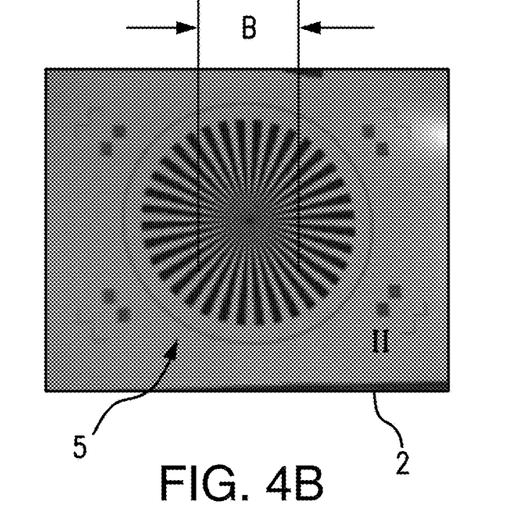
Figure 4C:
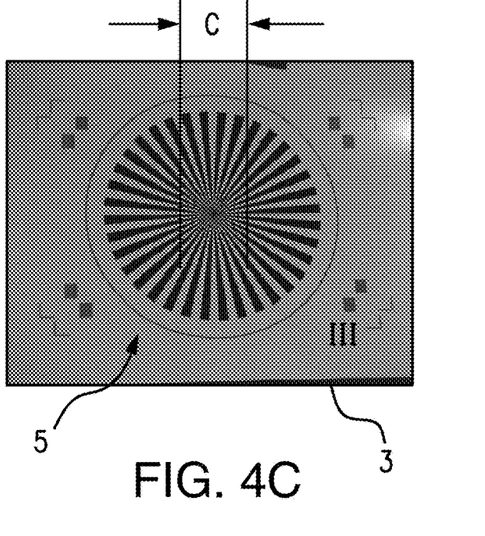
Figure 4D:
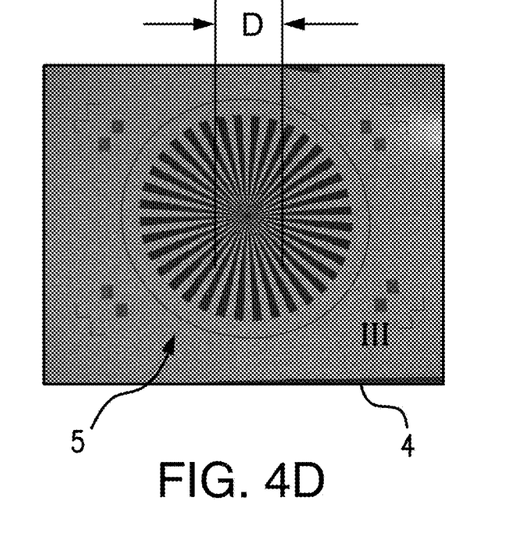

The relative quality of the image focus position in FIGS. 4A-4D is indicated by the width of the region within each image where radial focus target is unresolved, indicated by letters A-D in FIGS. 4A-4D. Notably, width A of image 1 in FIG. 4A is larger than width B of image 2 in FIG. 4B and indicates poor focus. Width B of image 2 in FIG. 4B is smaller than width A of image 1 in FIG. 4A, and indicates better focus than that of image 1. Width C of image 3 in FIG. 4C is smaller than width B of image 3 in FIG. 4C, indicating best focus of the three images. Width D of image D of image 4 in FIG. 4D is substantially equivalent to width C of image 3 in FIG. 4C, indicating the same quality of focus. However, the added noise degrades the image, adds contrast, and potentially makes more difficult an assessment of the focus quality using a contrast summation technique.

Figure 5A:
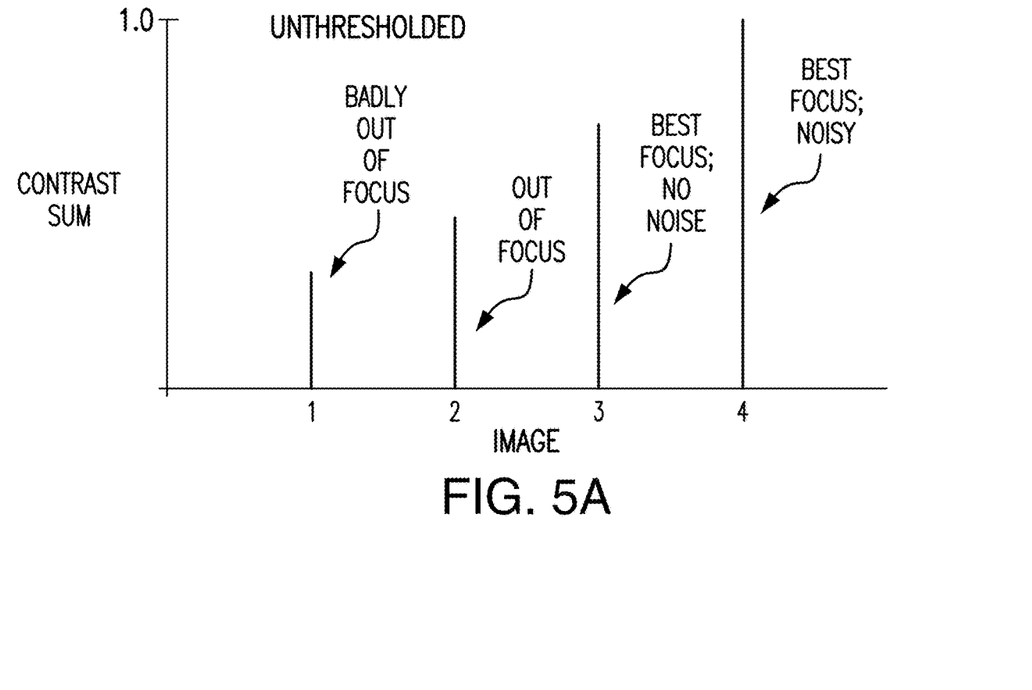
FIGS. 5A and 5B are graphs of adjustment inputs generated for the images of FIGS. 4A-4D, showing adjustment inputs generated for the images without thresholding and with thresholding, respectively.
Figure 5B:
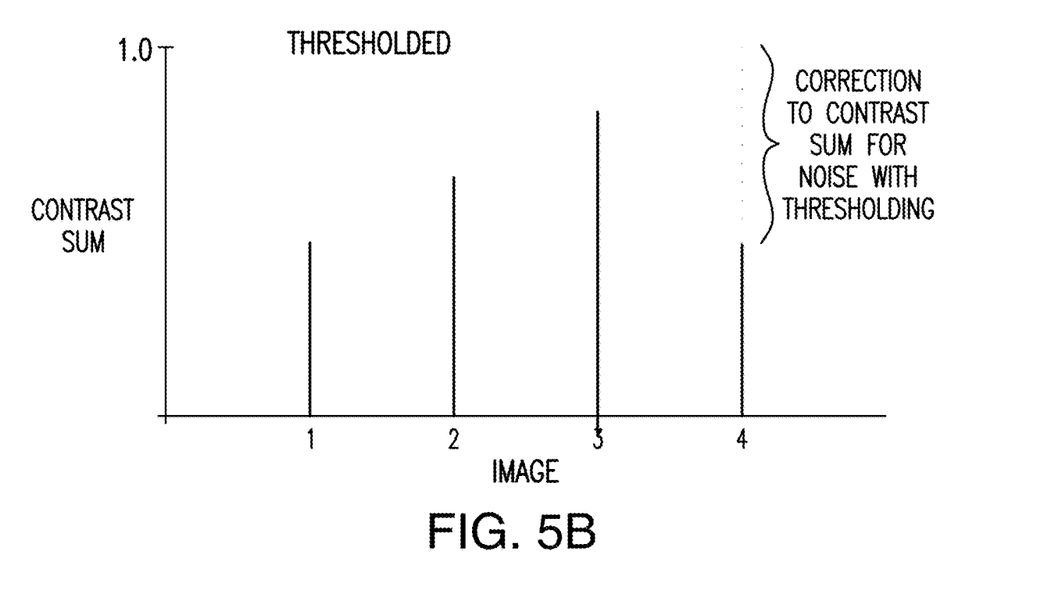

With references to FIGS. 5A and 5B, contrast summations are shown for images 1-4 of FIGS. 4A-4D using a Sobel filter with thresholding turned off in FIG. 5A and thresholding turned on in FIG. 5B. As will be appreciated by those of skill in the art in view of the present disclosure, some auto-focusing techniques can mistake noise in an image with the high contrast otherwise associated with good focus. This is shown in FIG. 5A with image 4, which has a contrast summation that is greater than that of images 1-3. While image 3 ranks better than out-of-focus images 1 and 2, noisy image 4 (at the same focus position) ranks higher, and would be preferentially selected as an in-focus image over image 3 based on the focus ranking metric shown on the right-hand scale of FIG. 5A.

FIG. 5B focus ranking of images 1-4 where the underlying image data is thresholded within a modified Sobel filter module, e.g., contrast difference module 128 (shown in FIG. 1). The filtering process ignores contrast within the image that is likely due to noise from each of images 1-4. Image 4, having more noise than images 103, has significantly more contrast removed from the contrast summation module than images 1-3 by the contrast difference module. Accordingly, an imaging device employing such thresholding would exclude noisy images from the focus analysis, instead preferentially selecting the image representative of best focus exclusive of noise. This reduces the likelihood of the loss of imaging quality due to noise in image data masking the quality of the associated focus position, improving the quality of images acquired once best focus is selected. As will be appreciated by those of skill in the art in view of the present disclosure, the threshold can be tuned such that the contrast summation of image 4 is substantially the same as image 3, thereby enabling focus assessment of an image independent of noise within an image.

The methods and systems of the present disclosure, as described above and shown in the drawings, provide for imaging systems and methods with superior properties including the capability to determine best focus from noisy and/or out-of-focus imagery. While the apparatus and methods of the subject disclosure have been shown and described with reference to preferred embodiments, those skilled in the art will readily appreciate that change and/or modifications may be made thereto without departing from the scope of the subject disclosure.

What is claimed is:

1. A method of focusing an imaging device, comprising:
   acquiring an image;
   determining an amount of contrast difference between adjacent pixels;
   determining whether the amount of contrast difference is likely due to noise or not, wherein determining includes;
   receiving a pixel contrast threshold for a Sobel filter; and
   adjusting focus while ignoring contrast differences determined to be likely due to noise; and
   checking for noise in the image by comparing contrast difference for each pixel with a contrast threshold, wherein checking noise in the image is done within the Sobel filter for an autofocusing algorithm, comparing the horizontal and/or vertical contrast with a horizontal and/or vertical threshold, on a pixel by pixel basis within the Sobel filter, and wherein ignoring contrast differences includes ignoring a pixel if its contrast is above the threshold, and not ignoring a pixel if its contrast is below the threshold.

2. The method as recited in claim 1, wherein contrast differences likely due to noise are determined based on a selected contrast threshold.

3. The method as recited in claim 2, wherein the selected contrast threshold is a vertical contrast threshold value or a horizontal contrast threshold.

4. The method as recited in claim 1, further comprising generating a contrast gradient for one or more pixels in the image.

5. The method as recited in claim 4, wherein the contrast gradient is a horizontal contrast gradient or a vertical gradient for the pixel.

6. The method as recited in claim 1, further comprising removing contrast from the image generated by noise in the image.

7. The method as recited in claim 1, further comprising adding the contrast difference to a contrast summation for the image when the contrast is within the contrast threshold, and adding zero to the contrast summation if the contrast is not within the contrast threshold.

8. An imaging device, comprising:
   a focus adjustment arrangement;
   a contrast difference module configured to determine an amount of contrast difference between adjacent pixels in an image acquired by a image acquisition module;
   a Sobel filter configured to provide a threshold intensity difference between a pixel and one or more adjacent pixels; and
   a processor configured to provide adjustment input to the focus adjustment arrangement based on the determined amount of contrast difference, the processor further configured to ignore the determined amount of contrast difference if the determined amount of contrast difference is likely due to noise or not, the processor further configured to check for noise in the image by comparing contrast difference for each pixel with a contrast threshold, wherein checking noise in the image is done within the Sobel filter for an autofocusing algorithm, comparing the horizontal and/or vertical contrast with a horizontal and/or vertical threshold, on a pixel by pixel basis within the Sobel filter, and wherein ignoring contrast differences includes ignoring a pixel if its contrast is above the threshold, and not ignoring a pixel if its contrast is below the threshold.

9. The imaging device as recited in claim 8, wherein the focus adjustment arrangement includes at least one movable lens.

10. The imaging device as recited in claim 8, further comprising a memory having a plurality of program modules recorded on the memory that, when read by the processor, cause the processor to:
   acquire an image;

determine an amount of contrast difference between adjacent pixels in the image;

determine whether the amount of contrast difference is likely due to noise or not; and adjust focus while ignoring contrast differences determined to be likely due to noise.

11. The imaging device as recited in claim 8, wherein the instructions further cause the processor to check for noise in the image by comparing contrast difference for each pixel with a contrast threshold, and remove contrast from the image generated by noise in the image on a pixel-by-pixel basis.

12. The imaging device as recited in claim 8, wherein the instructions further cause the processor to receiving a pixel contrast threshold for a Sobel filter, generate a contrast gradient for one or more pixels in the image, and apply the contrast threshold prior to summing the pixel contrast in a contrast summation for the image.

\* \* \* \* \*